US012585650B2

(12) United States Patent
Berkers et al.

(10) Patent No.: US 12,585,650 B2
(45) Date of Patent: Mar. 24, 2026

(54) DETERMINING AN OPTIMAL PATH TO SEARCH A BRANCH TARGET BUFFER

(71) Applicant: INTERNATIONAL BUSINESS MACHINES CORPORATION, Armonk, NY (US)

(72) Inventors: Martijn D. Berkers, Boeblingen (DE); Maarten J. Boersma, Holzgerlingen (DE); Edward Thomas Malley, Eastchester, NY (US); Brian Robert Prasky, Campbell Hall, NY (US); James Bonanno, Liberty Hill, TX (US); Jang-Soo Lee, Poughkeepsie, NY (US); Dominic Ditomaso, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/796,437

(22) Filed: Aug. 7, 2024

(65) Prior Publication Data
US 2026/0044504 A1    Feb. 12, 2026

(51) Int. Cl.
*G06F 16/00* (2019.01)
*G06F 16/2453* (2019.01)

(52) U.S. Cl.
CPC .............................. *G06F 16/24542* (2019.01)

(58) Field of Classification Search
CPC ................................................ G06F 16/24542
(Continued)

(56) References Cited

U.S. PATENT DOCUMENTS 7,783,870 B2    8/2010 Levitan
7,895,422 B2 *  2/2011 Moyer .................. G06F 9/3806
                                            712/240
(Continued)

FOREIGN PATENT DOCUMENTS

TW            523712 B      3/2003

OTHER PUBLICATIONS

Zhang, Zhao, Lecture 8: Branch Prediction slides, Iowa State University CPRE 581 Fall 2005, Branch and Target Predictions, 2005, 5 pages.
Baer, Jean-Loup, Branch Prediction II Lecture slides, University of Washington CSE 471 Autumn 2002, Branch Target Buffers, Oct. 2002, 4 pages.
Authors et al.: Disclosed Anonymously, IP.com No. IPCOM000137911D, Method for adding a confidence mechanism to a branch prediction corrector, IP.com Electronic Publication Date: Jun. 29, 2006, 5 pages.

(Continued)

*Primary Examiner* — Chelcie L Daye
(74) *Attorney, Agent, or Firm* — CANTOR COLBURN LLP; Edward Wixted

(57) ABSTRACT

An approach is provided for determining an optimal path for searching a branch target buffer (BTB). Initial BTB search index results are generated by searching a prediction latency-optimized first accelerator. The initial BTB search index results are added as tentative items in a search index list. Other BTB search index results are generated by searching a capacity-optimized second accelerator. The first and second accelerators run concurrently. Difference(s) are determined between one or more results of the other BTB search index results and one or more results of the initial BTB search index results based on a comparison between respective results in the other BTB search index results and the initial BTB search index results. The one or more results of the initial BTB search index results are replaced in the search index list with the one or more results of the other BTB search index results.

20 Claims, 9 Drawing Sheets

(58) Field of Classification Search
USPC ........................................................ 707/716
See application file for complete search history.

(56) References Cited

U.S. PATENT DOCUMENTS

| | | |
|---|---|---|
| 10,423,419 B2 | 9/2019 | Bonanno |
| 10,705,848 B2 | 7/2020 | Vougioukas |
| 10,838,730 B2 | 11/2020 | Vougioukas |
| 11,048,318 B2 | 6/2021 | Sebot |
| 2002/0194462 A1 | 12/2002 | Henry |
| 2006/0218385 A1 | 9/2006 | Smith |
| 2016/0239305 A1 | 8/2016 | Bonanno |
| 2018/0121200 A1* | 5/2018 | Chou ................... G06F 9/3808 |
| 2018/0165095 A1 | 6/2018 | Bonanno |
| 2023/0057600 A1 | 2/2023 | Malley |

OTHER PUBLICATIONS

Authors et al.: Disclosed Anonymously, IP.com No. IPCOM000191968D, Method to Exclude Bad Patterns From A Pattern History Table Branch Predictor, IP.com Electronic Publication Date: Jan. 19, 2010, 5 pages.
Authors et al.: Disclosed Anonymously, IP.com No. IPCOM000266374D, Size-Efficient Branch Target Prediction Utilizing a Small CAM, IP.com Electronic Publication Date: Jul. 8, 2021, 5 pages.
Prof. Onur Mutlu, 18-740/640, Computer Architecture Lecture 5: Advanced Branch Prediction, Sep. 16, 2015, 93 pages.
Silvano, C. et al.; A Survey on Deep Learning Hardware Accelerators for Heterogeneous HPC Platforms, Jun. 27, 2023, arXiv:2306.15552v1 [cs.AR], 53 pages.

* cited by examiner

100

COMPUTER 101

PROCESSOR SET 110

| PROCESSING CIRCUITRY 120 | CACHE 121 |
|---|---|

COMMUNICATION FABRIC 111

VOLATILE MEMORY 112

PERSISTENT STORAGE 113

OPERATING SYSTEM 122

CODE FOR BRANCH TARGET BUFFER SEARCH PATH DETERMINATION USING BRANCH PREDICTION ACCELERATORS HAVING DIFFERENT ACCURACIES   200

PERIPHERAL DEVICE SET 114

| UI DEVICE SET 123 | STORAGE 124 | IoT SENSOR SET 125 |
|---|---|---|

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
|---|---|
| VIRTUAL MACHINE SET 143 | CONTAINER SET 144 |

*FIG. 1*

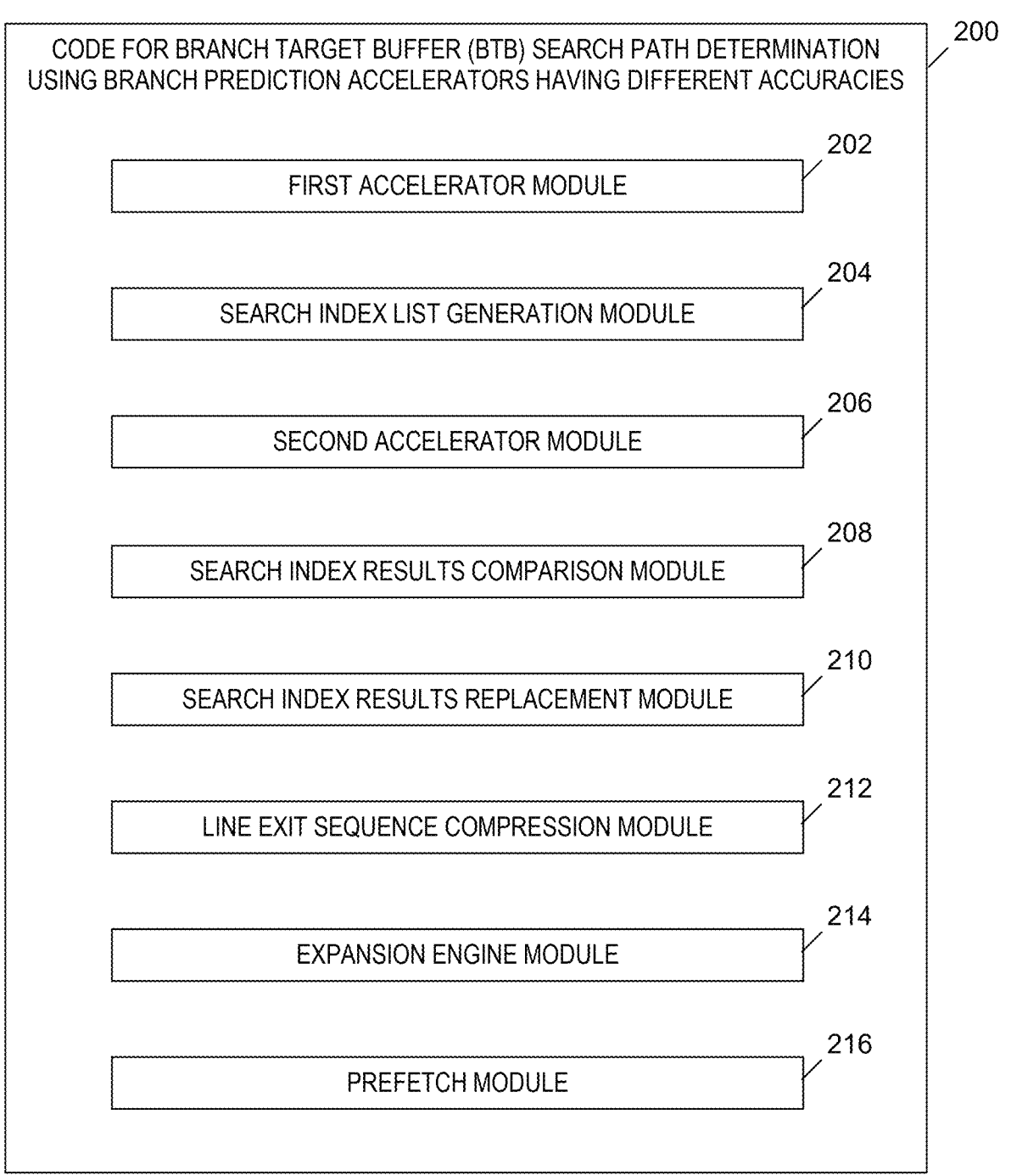

CODE FOR BRANCH TARGET BUFFER (BTB) SEARCH PATH DETERMINATION
USING BRANCH PREDICTION ACCELERATORS HAVING DIFFERENT ACCURACIES

200

FIRST ACCELERATOR MODULE

202

SEARCH INDEX LIST GENERATION MODULE

204

SECOND ACCELERATOR MODULE

206

SEARCH INDEX RESULTS COMPARISON MODULE

208

SEARCH INDEX RESULTS REPLACEMENT MODULE

210

LINE EXIT SEQUENCE COMPRESSION MODULE

212

EXPANSION ENGINE MODULE

214

PREFETCH MODULE

ENTRY POINT
(X0)

702 { LINE X

704 { LINE X+1

706 { LINE X+2

B0     B1     B2

B3     B4     B5

B6     B7     B8

800

| Format A | Format B |
|---|---|
| Entry Opposing Valid | Entry Opposing Valid |
| Op2 Adjacent(0:1) | Target 1 IA(32:63) |
| Op2 Opposing Valid | Target 1 Opposing Valid |
| Target IA(0:63) | Target 2 IA(32:63) |

DETERMINING AN OPTIMAL PATH TO SEARCH A BRANCH TARGET BUFFER

BACKGROUND

The present invention relates to microprocessor design, and more particularly to using branch prediction accelerators having different accuracies to find a path to search a branch target buffer.

SUMMARY

In one embodiment, the present invention provides a computer-implemented method. The method includes generating initial branch target buffer (BTB) search index results in a first stream of BTB search index results by searching a first accelerator optimized to minimize prediction latency. The method further includes adding the initial BTB search index results as tentative items in a search index list. The method further includes generating other BTB search index results in a second stream of BTB search index results by searching a second accelerator optimized to maximize capacity. The second accelerator runs concurrently with the first accelerator. The method further includes determining one or more differences between one or more results of the other BTB search index results and one or more results of the initial BTB search index results based on a comparison of respective results in the other BTB search index results and the initial BTB search index results. The method further includes, in response to determining the difference, replacing, by a processor set, the one or more results of the initial BTB search index results in the search index list with the one or more results of the other BTB search index results.

A computer system and a computer program product corresponding to the above-summarized computer-implemented method are also described herein.

BRIEF DESCRIPTION OF THE DRAWINGS

FIG. 1 is a block diagram of a system for determining an optimal path to search a BTB using branch prediction accelerators having different accuracies, in accordance with embodiments of the present invention.

FIG. 2 is a block diagram of modules included in code included in the system of FIG. 1, in accordance with embodiments of the present invention.

DETAILED DESCRIPTION

Overview

Figure 3:
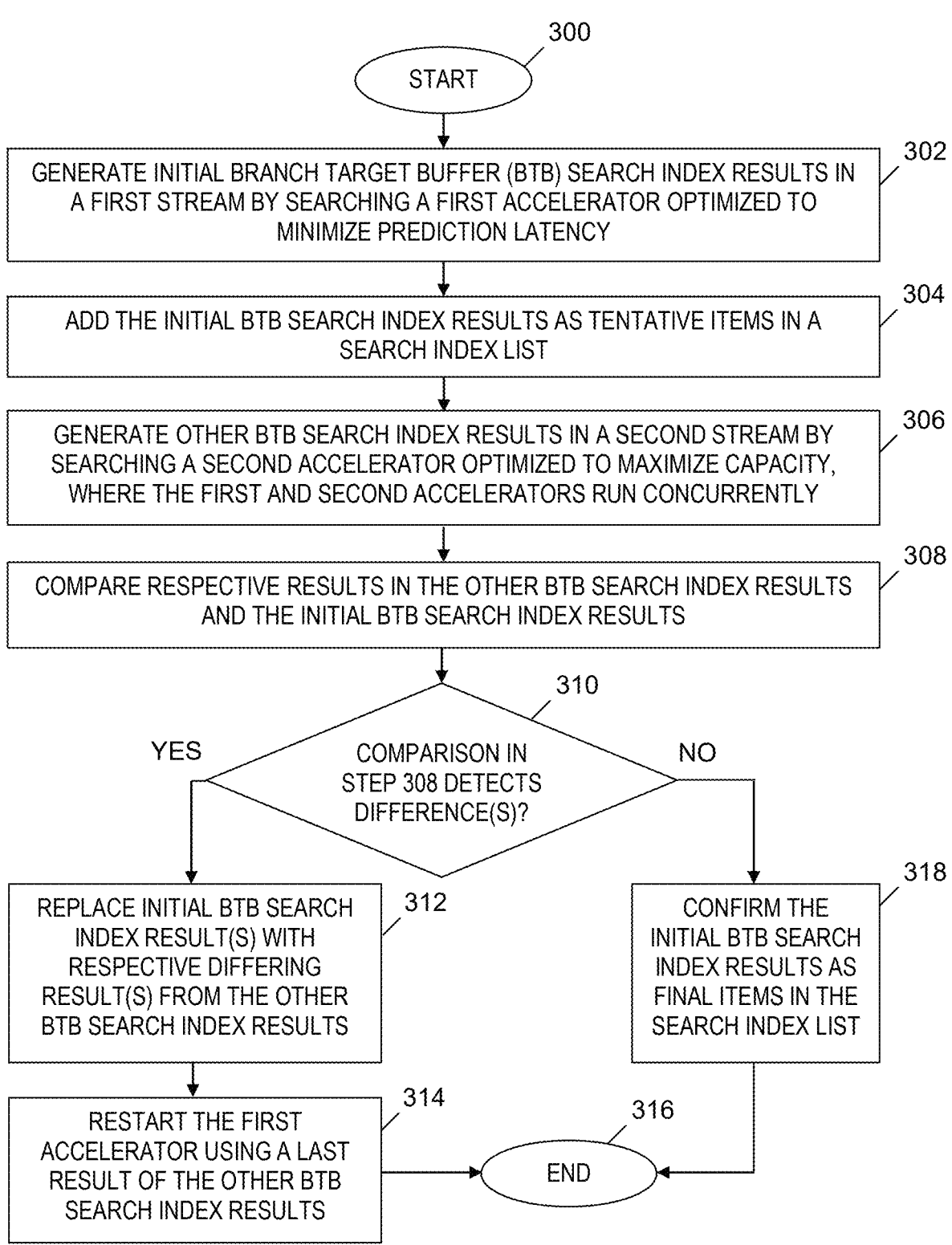
FIG. 3 is a flowchart of a process of determining an optimal path to search a BTB using branch prediction accelerators having different accuracies, where operations of the flowchart are performed by modules in FIG. 2, in accordance with embodiments of the present invention.

A branch target address cache (i.e., line exit accelerator) speeds up computer program execution by storing target addresses of recently observed taken branches. During code execution, these stored target addresses are used to speculatively search the branch target buffer (BTB) to provide the next branch prediction as early as possible. These branch predictions are used to access the instruction cache to provide instruction text to the decode, sequencing, and execution units before branches are resolved in the code stream.

Fast implementations of known accelerators cover only a small code footprint. Because large commercial applications typically have a large code footprint, there is a need to store more target address predictions than a known accelerator can realistically support.

An accelerator table having a larger capacity typically has an increased access latency, which imposes a performance penalty. Thus, the naïve approach of "making the tables larger" to cover more program code has limitations.

Embodiments of the present invention address the aforementioned unique challenges by providing two branch target address caches (i.e., a first accelerator and a second accelerator), which run concurrently. The first accelerator is a known branch target address cache that is optimized for short latency, providing a new index into the BTB structures as early as possible. The second accelerator complements the first accelerator and is optimized for high capacity, covering a maximized code footprint. The second accelerator is more accurate than the first accelerator because the second accelerator (i) uses resolved branch information and (ii) additional bits of the target address for indexing and tagging the accelerator. To accommodate the high capacity, the second accelerator has higher latency. To compensate for the higher latency, each access can provide multiple search indexes into the BTB. As the first accelerator and the second accelerator run concurrently, both accelerators provide a stream of BTB search indexes. The first accelerator provides an initial BTB search index. The second accelerator provides its BTB search index, which either confirms or replaces the initial BTB search index.

Embodiments of the present invention further address the aforementioned unique challenges by increasing the effective capacity of the second accelerator by storing one or more line exit branches per accelerator table entry. Each table entry represents a sequence of line exit branches that are encountered in the program flow, which is different from table entries of a known accelerator, where an entry always contains exactly one line exit branch. In one embodiment, the implementation of the second accelerator uses a substantially large table, allowing for multiple targets per table access, thereby reducing the average table access latency per provided target.

In one embodiment, the target predictions are done speculatively without knowledge of the branch or type of branch that predicts each target, and are not limited by a need to wait until decode time to decide whether or not an override should occur.

In one embodiment, a line exit sequence compression technique disclosed herein stores multiple line exit branches in a table entry for the second accelerator by exploiting locality of taken branch behavior. This exploitation of locality is based on it being statistically likely that a taken branch target address is relatively close to the branch instruction address, where it is sufficient to store only a partial target address, because the higher-order bits of the target address are identical to the higher-order bits of the branch instruction address. Thus, the line exit sequence compression technique allows for a storage of more branch targets in a given number of bits. To support different locality properties, the line exit sequence compression technique selects a particular compression scheme. Within the selected compression scheme, the line exit sequence compression technique compresses a sequence of observed line exit branches into a series of table entries. As a required number of table entries decreases under a selected compression scheme, the compression rate and the effective capacity increases. Per table entry (or package), multiple slots are available to store branch target addresses.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for determining an optimal path to search a BTB using branch prediction accelerators having different accuracies, in accordance with embodiments of the present invention. Computing environment 100 contains an example of an environment for the execution of at least some of the computer code involved in performing the inventive methods, such as code 200 for branch target buffer search path determination using branch prediction accelerators having different accuracies. Branch prediction accelerators are also referred to herein as BTB index accelerators and branch target address caches. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

System and Process for Determining a Branch Target Buffer Search Path

FIG. 2 is a block diagram of modules included in code included in the system of FIG. 1, in accordance with embodiments of the present invention. Code 200 includes a first accelerator module 202, a search index list generation module 204, a second accelerator module 206, a search index results comparison module 208, a search index results replacement module 210, a line exit sequence compression module 212, an expansion engine module 214, and a prefetch module 216.

First accelerator module 202 is configured to run a first BTB index accelerator, which is optimized for minimal prediction latency, concurrently with a second BTB index accelerator, which is optimized for maximized capacity. The first BTB index accelerator is a known branch target address cache and is also referred to herein as a "first accelerator,"

"latency accelerator," and "prediction latency-optimized accelerator." First accelerator module 202 is further configured to provide a new index into the BTB as early as possible in the processing steps of a microprocessor, and to generate initial BTB search index results in a first stream of BTB search indexes by searching the first accelerator. Search index list generation module 204 is configured to add the aforementioned initial BTB search index results as tentative items in a search index list that specifies a path to search the BTB.

Second accelerator module 206 is configured to run the aforementioned second BTB index accelerator concurrently with the first accelerator. The second BTB index accelerator is a novel branch target address cache that is also referred to herein as a "second accelerator," "capacity accelerator," and "capacity-optimized accelerator." Second accelerator module 206 is further configured to cover a code footprint that is as large as possible (i.e., a footprint that exceeds a specified footprint threshold size) and to generate other BTB search index results in a second stream of BTB search indexes by searching the second accelerator. The second accelerator is more accurate than the first accelerator because the second accelerator (i) uses resolved branch information and (ii) compared to the first accelerator, uses more bits of the target address for indexing and tagging the accelerator. To accommodate the higher capacity, the second accelerator has a latency that is greater than the latency of the first accelerator. To compensate for the greater latency, each access in the second accelerator can provide multiple search indexes into the BTB.

Search index results comparison module 208 is configured to compare the aforementioned initial BTB search index results to the aforementioned other BTB search index results by comparing respective results (i.e., corresponding results, according to an order of the results) in the initial BTB search index results and the other BTB search index results. Search index results comparison module 208 is further configured to detect whether there are one or more differences between the initial BTB search index results and the other BTB search index results, based on the aforementioned comparison of respective results. A difference detected by search index results comparison module 208 is a difference in (i) line numbers, (ii) entry points, and/or (iii) branches.

Search index results replacement module 210 is configured to confirm the initial BTB search index results as final items in the search index list or replace one or more results included in the initial BTB search index results with one or more respective, differing results included in the other BTB search index results. Search index results replacement module 210 confirms the initial BTB search index results in response to the search index results comparison module 208 failing to detect any of the aforementioned differences between the initial BTB search index results and the other BTB search index results.

Search index results replacement module 210 replaces the one or more results included in the initial BTB search index results with the one or more respective, differing results included in the other BTB search index results in response to the search index results comparison module 208 detecting one or more differences, as described above. Search index results replacement module 210 is further configured to restart the first accelerator using a last result included in the other BTB search index results generated by the second accelerator. The restart of the first accelerator is performed in response to the replacement of the result(s) included in the initial BTB search index results with the respective, differing result(s) included in the other BTB search index results, as described above.

Line exit sequence compression module 212 is configured to store and compress multiple line exit branches in each entry of multiple entries of a table of the second accelerator, where the compression provides a compressed sequence of the multiple line exit branches. Line exit sequence compression module 212 is further configured to (i) extract given entries included in the multiple entries of the table of the second accelerator, (ii) execute a hit detect logic for each of the extracted given entries to detect a particular given entry that is to be further processed, (iii) based on the execution of the hit detect logic, select the particular given entry from the multiple entries, and (iv) send the selected given entry to an expansion engine. Expansion engine module 214 is further configured to reindex the second accelerator based on a final target in the selected given entry and to find a next sequence of line exit branches by using the reindexed BTB accelerator.

Expansion engine module 214 is configured to operate the expansion engine and convert the compressed sequence of line exit branches included in the selected given entry into decompressed multiple lines indicating predicted multiple targets. Expansion engine module 214 is further configured to add the decompressed multiple lines to the second stream of BTB search index results.

Prefetch module 216 is configured to (i) send a full instruction address (IA) from the second accelerator to an instruction cache and (ii) provide prefetch information to the instruction cache earlier than a prediction time via a prediction pipeline, where the provision of the prefetch information is based on the full instruction address being sent to the instruction cache and the second accelerator being sized to include a number of bits of the full instruction address that is required for the instruction cache to generate a fetch or to prefetch data. Prefetch module 216 is further configured to, based on the prefetch information being provided earlier than the prediction time, use the instruction cache to perform a prefetch using the prefetch information, which avoids a penalty of an instruction cache miss.

The functionality of the modules included in code 200 is described in more detail in the discussions presented below relative to FIGS. 3-12.

FIG. 3 is a flowchart of a process of determining an optimal path to search a BTB using branch prediction accelerators having different accuracies, where operations of the flowchart are performed by modules in FIG. 2, in accordance with embodiments of the present invention. The process of FIG. 3 begins at a start node 300. In step 302, first accelerator module 202 generates initial BTB search index results in a first stream of BTB search index results by searching the first accelerator, which is optimized to minimize prediction latency (i.e., a prediction latency-optimized accelerator).

In step 304, search index list generation module 204 adds the initial BTB search index results generated in step 302 as tentative items in a search index list that specifies a path to search the BTB.

In step 306, second accelerator module 206 generates other BTB search index results in a second stream of BTB search index results by searching the second accelerator, which is optimized to maximize capacity (i.e., a capacity-optimized accelerator). The first and second accelerators run concurrently.

In step 308, search index results comparison module 208 compares respective results in the other BTB search index results generated in step 306 and the initial BTB search index results generated in step 302.

In step 310, search index results comparison module 208 determines whether the comparison in step 308 detects one or more differences between the other BTB search index results and the initial BTB search index results. If search index results comparison module 208 detects the aforementioned one or more differences, then the Yes branch is followed and step 312 is performed.

In step 312, search index results replacement module 210 replaces one or more of the initial BTB search index results generated in step 302 with one or more respective, differing results included in the other BTB search index results generated in step 306.

In step 314, search index results replacement module restarts the first accelerator using a last result of the other BTB search index results.

Following step 314, the process of FIG. 3 ends at an end node 316.

Returning to step 310, if search index results comparison module 208 does not detect one or more of the aforementioned differences, then the No branch is followed and step 318 is performed.

In step 318, search index results replacement module 210 confirms the initial BTB search index results as final items in the search index list.

Following step 318, the process of FIG. 3 ends at end node 316.

In one embodiment, due to the relative slowness of the second accelerator, the search index results generated by the second accelerator may be provided too late to be of any value (i.e., the search index results were generated by the second accelerator subsequent to the initial BTB search index results being used as the prediction in the search index list). A lateness detection module (not shown in FIG. 2) within code 200 determines that the search index results generated by the second accelerator were generated subsequent to the initial BTB search index results being used as a prediction in the search index list. In response to the lateness detection module determining that the search index results were provided too late to be of any value, a restart module (not shown in FIG. 2) included in code 200 restarts the second accelerator based on a target address of a recent branch prediction. As used herein, a recent branch prediction is a branch prediction generated within a specified amount of time prior to a current time.

Figure 4:
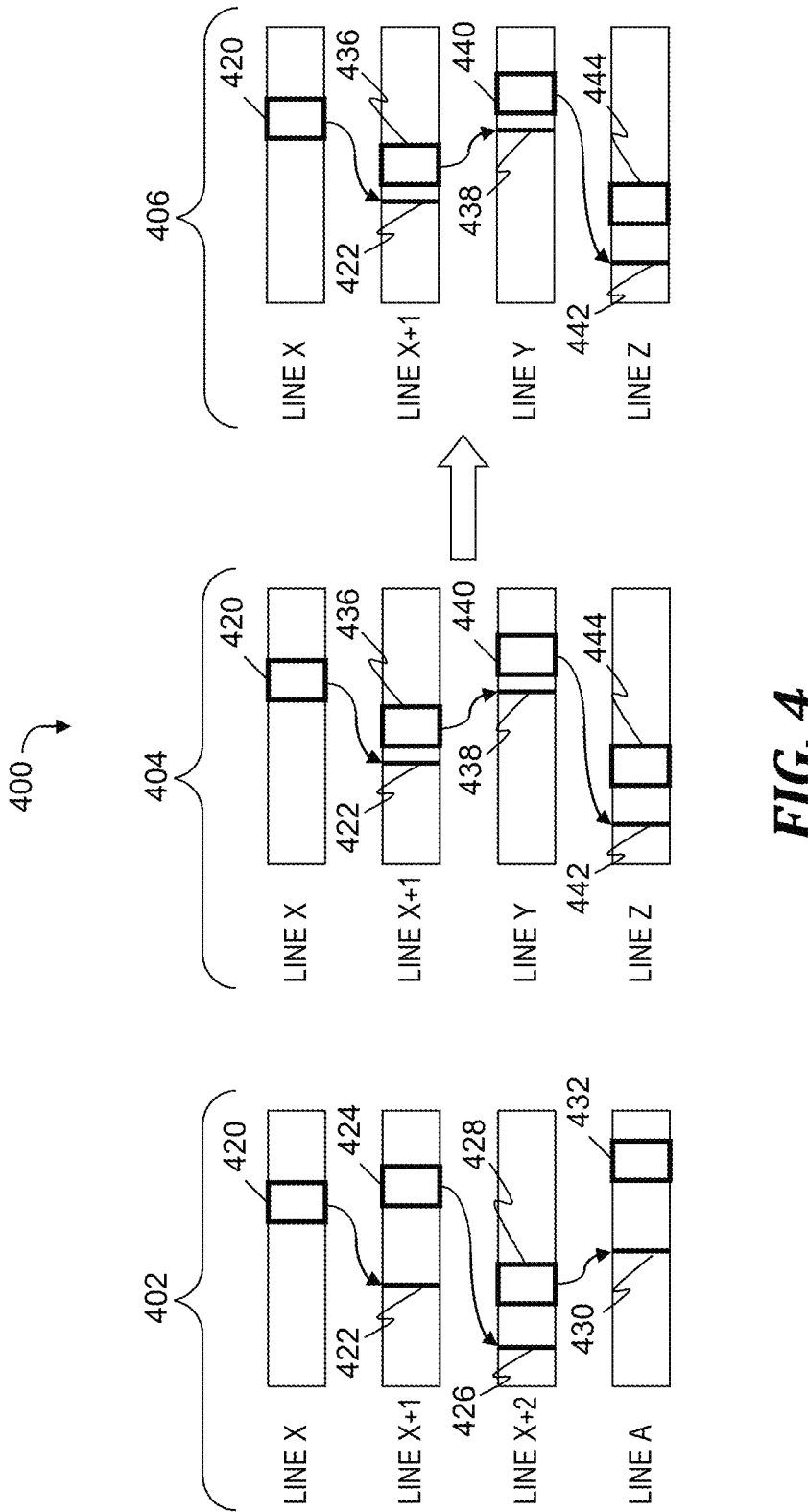
FIG. 4 is an example of the first accelerator and the second accelerator using the process of FIG. 3 to determine an optimal path to search the BTB, in accordance with embodiments of the present invention.

FIG. 4 is an example 400 of the first accelerator and the second accelerator using the process of FIG. 3 to determine an optimal path to search the BTB, in accordance with embodiments of the present invention. Example 400 includes four predictions 402 provided by the first accelerator, one prediction 404 provided by the second accelerator, and a search index list 406 used to search the BTB. The first and second accelerators work together to find an optimal path to search the BTB, with each of the first and second accelerators using Line X as the initial entry point. Predictions 402 include the sequence Line X, Line X+1, Line X+2, and Line A, which are the results of four searches by the first accelerator to determine an initial guess of a path of indexes used to search the BTB. The path provided by the first accelerator includes a branch 420 in Line X, which references an entry point 422 in Line X+1, a branch 424 in Line X+1, which references an entry point 426 in Line X+2, a branch 428 in Line X+2, which references an entry point 430 in Line A, and a branch 432 in Line A.

Prediction 404 includes the sequence Line X, Line X+1, Line Y, and Line Z, which is a path resulting from one search by the second accelerator, where the path is different from the initial guess provided by the first accelerator. The path provided by the second accelerator includes branch 420 in Line X, which references entry point 422 in Line X+1, a branch 436 in Line X+1, which references an entry point 438 in Line Y, a branch 440 in Line Y, which references an entry point 442 in Line Z, and a branch 444 in Line Z.

The path provided by the second accelerator confirms the first two lines (i.e., Line X and Line X+1) predicted by the first accelerator, but indicates differences in the last two lines (i.e., Line Y in prediction 404 differs from Line X+2 in predictions 402 and Line Z in prediction 404 differs from Line A in predictions 402), and further indicates a difference in the branch predicted to be taken in Line X+1 (i.e., branch 436 in Line X+1 is different from branch 424 in Line X+1).

An initial search index list (not shown) specifies a path that is initially identical to the path indicated in predictions 402, but in response to prediction 404 being made, search index list 406 is updated from the initial search index list to include the confirmed Line X and Line X+1 and branch 420 and the referenced entry point 422 included in predictions 402, along with the updates provided by the path specified in prediction 404; i.e., Line Y and Line Z as the third and fourth lines, branch 436 in Line X+1 referencing entry point 438 in Line Y, branch 440 in Line Y referencing entry point 442 in Line Z, and branch 444 in Line Z.

Figure 5:
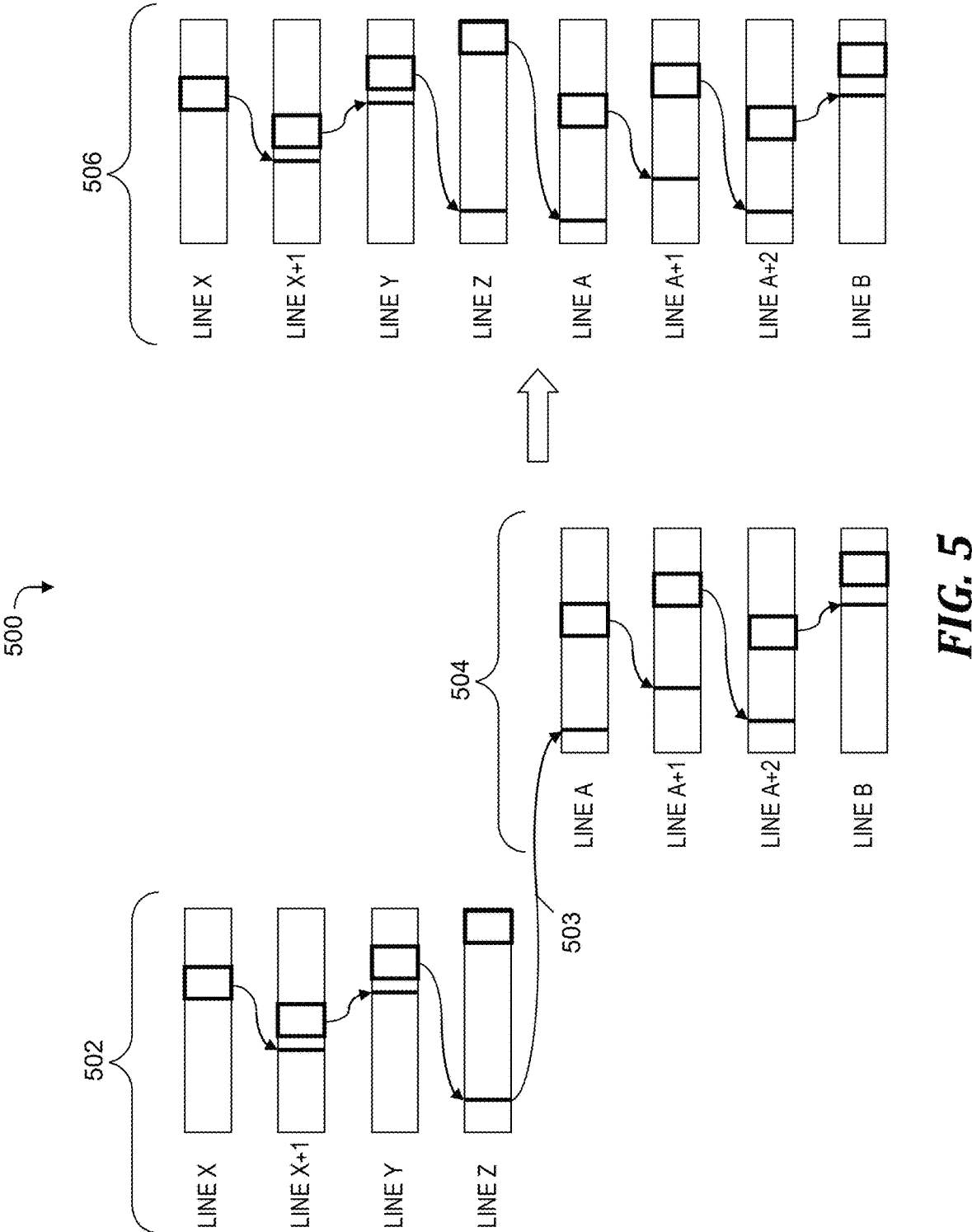
FIG. 5 is an example of restarting the first accelerator in the process of FIG. 3, in accordance with embodiments of the present invention.

FIG. 5 is an example 500 of restarting a first accelerator in the process of FIG. 3, in accordance with embodiments of the present invention. Example 500 includes a restart of the first accelerator by using a search index provided by the second accelerator (i.e., by using the last target address found by the second accelerator). The restart in example 500 is performed in response to initial BTB search index results being replaced, as shown in FIG. 4.

Example 500 includes a prediction 502 generated by the second accelerator. Prediction 502 includes the sequence of Line X, Line X+1, Line Y, and Line Z, along with branches and entry points in the aforementioned lines. The branches are indicated by the bold-outlined rectangles in the lines and the entry points are indicated by the bold vertical line segments in the lines. The arrows indicate an association between a branch and the entry point referenced by the branch.

Example 500 further includes a restart 503 of the first accelerator using the last result (i.e., Line Z) of the second accelerator. Restart 503 results in predictions 504 generated by the first accelerator. Predictions 504 include the sequence of Line A, Line A+1, Line A+2, and Line B, along with the branches and entry points indicated by the bold-outlined rectangles and bold vertical line segments, respectively.

Example 500 further includes a search index list 506 (i.e., the BTB indexes to be searched) resulting from prediction 502 and predictions 504. Search index list 506 includes the sequence of Line X, Line X+1, Line Y, Line Z, Line A, Line A+1, Line A+2, and Line B, along with the branches and entry points indicated by the bold-outlined rectangles and bold vertical line segments, respectively.

Line Exit Sequence Compression

Figure 6:
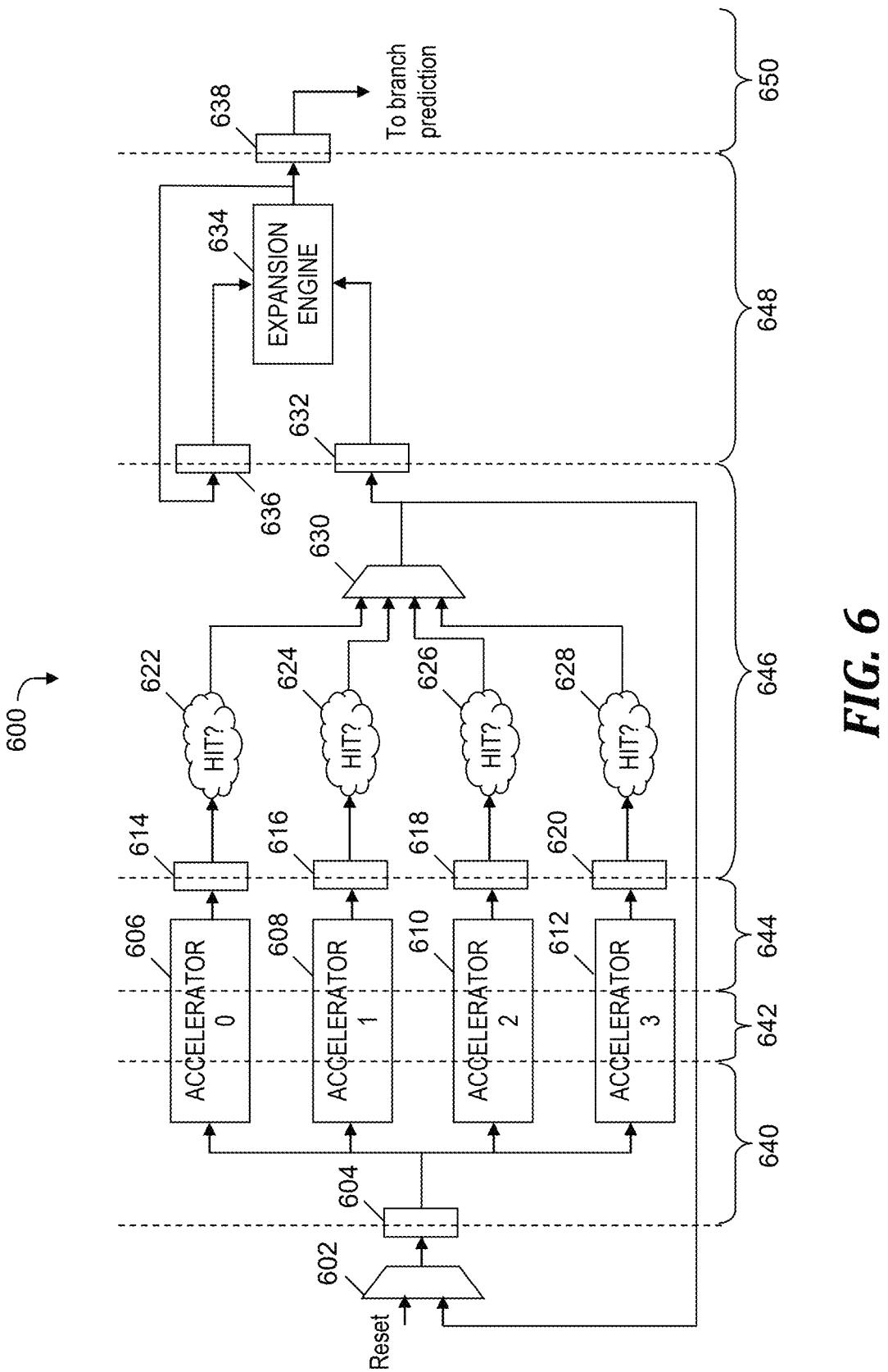
FIG. 6 is an example of providing line exit sequence compression for the second accelerator used in the process of FIG. 3, where multiple targets are provided per table access to reduce average table access latency per target, in accordance with embodiments of the present invention.

FIG. 6 is an example 600 of providing line exit sequence compression for the second accelerator used in the process of FIG. 3, where multiple targets are provided per table access to reduce average table access latency per target, in accordance with embodiments of the present invention. Example 600 illustrates using high density arrays in an implementation of line exit sequence compression for the second accelerator that maximizes the code footprint being supported while minimizing the size of tables in the second accelerator. Example 600 includes a multiplexer 602 receiving a reset, high density arrays 606, 608, 610, and 612 (i.e., Accelerator 0, Accelerator, 1, Accelerator 2, and Accelerator 3), and latches 604, 614, 616, 618, 620, 632, 636, and 638. The aforementioned latches capture data whenever the clock pulses and hold the data until the next clock pulse. Furthermore, the aforementioned latches enable pipelining and separate the pipeline cycles discussed below. Each of high density arrays 606, 608, 610, and 612 extracts an entry and hit detect logic 622, 624, 626, and 628 reports a hit on one of the extracted entries (or on none of the entries if, for example, example 600 has never been in this code before). A multiplexer 630 selects the entry on which the hit was reported. In one embodiment, the selected entry includes multiple line exit branches because the entry has been compressed sufficiently. In response to the selection of the entry, example 600 uses a final target in the selected entry to reindex the accelerator to find the next set of targets. Example 600 indicates the reindexing by the arrow from multiplexer 630 to multiplexer 602. Example 600 also sends the selected entry to an expansion engine 634, which executes expansion logic that converts (i.e., decompresses) the compressed selected entry into decompressed multiple targets that are contained in the compressed selected entry. The loop from expansion engine 634 to latch 636 and returning back to expansion engine 634 indicates that each line being decompressed in the prediction and the associated addresses that are generated require a completion of a pipeline cycle.

Example 600 sends the decompressed multiple targets to be included in results generated by the second accelerator within the process described above for determining the optimal path to search the BTB (i.e., the decompressed multiple targets are included in the results generated in step 306 in FIG. 3).

The dashed vertical lines in FIG. 6 indicate pipeline cycles 640, 642, 644, 646, 648, and 650. An access of each of the high density arrays 606, 608, 610, and 612 requires multiple cycles, as shown by pipeline cycles 640, 642, and 644, whose dashed lines overlap Accelerator 0, Accelerator 1, Accelerator 2, and Accelerator 3. Waiting for a completion of multiple cycles that results in a selection of only a single target is detrimental to performance. One or more embodiments avoid this detriment and maximize throughput by taking advantage of the high density of the high density arrays (e.g., Accelerator 0, Accelerator 1, Accelerator 2, and Accelerator 3), from which compressed entries are extracted and a compressed entry is selected from the extracted entries, where each of the compressed entries (including the selected entry) contains multiple line exit branches.

Figures 7, 8:
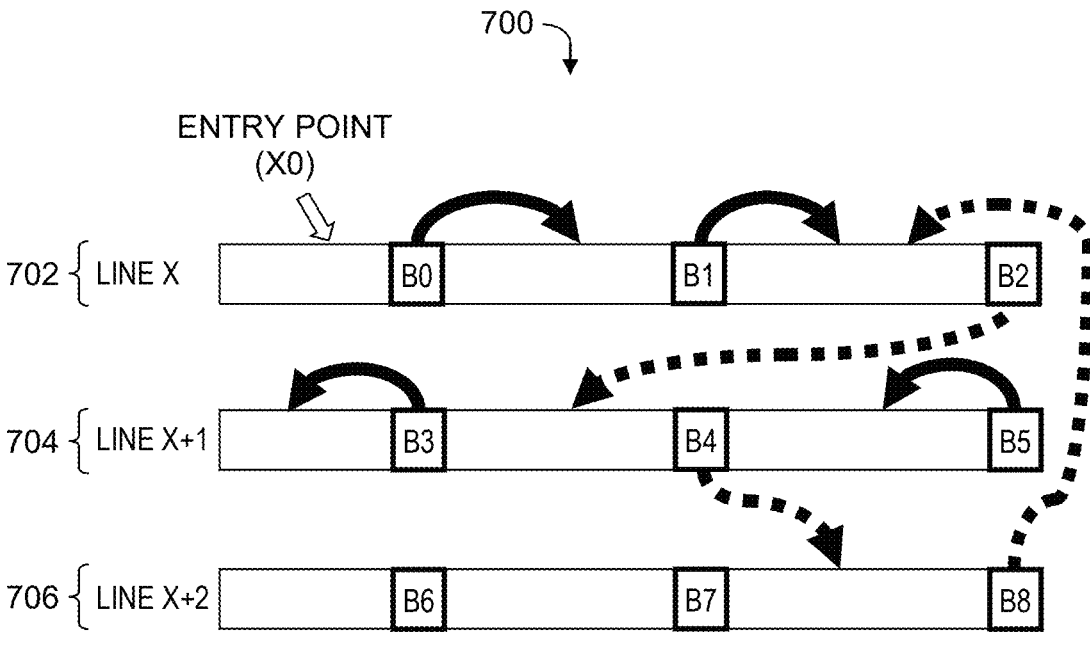
FIG. 7 is a sequence of code occupying three consecutive lines to illustrate a basis for storing multiple branches in a single entry of the second accelerator used in the process of FIG. 3, by avoiding separate storage of bits that line addresses have in common, in accordance with embodiments of the present invention.
FIG. 8 is a table of examples of compression formats used in line exit sequence compression for the second accelerator used in the process of FIG. 3, in accordance with embodiments of the present invention.

FIG. 7 is a sequence of code 700 occupying three consecutive lines to illustrate a basis for storing multiple branches in a single entry of the second accelerator used in the process of FIG. 3, by avoiding separate storage of bits that line addresses have in common, in accordance with embodiments of the present invention. In one embodiment, multiple line exit branches are stored in a single entry in the second accelerator by exploiting locality of taken branch behavior. That is, it is statistically likely that a taken branch target address is relatively close to the branch instruction address. Using this exploited locality, it is sufficient to store only a partial target address (i.e., store a specified portion of the address of the target without storing another portion of the address of the target), because the higher-order bits are identical to the higher-order bits of the branch instruction address, which allows for storing more branch targets in a given number of bits.

Example 700 includes lines 702, 704, and 706 (i.e., Line X, Line X+1, and Line X+2). Line X has an entry point (X0) and includes branches B0, B1, and B2. Line X+1 includes branches B3, B4, and B5. Line X+2 includes branches B6, B7, and B8. Branches B2, B4, and B8 are line exit branches, as indicated by the dashed arrows that indicate an exit from the line that includes the line exit branch and an entry into a different line. In each case of the line exit branches in Example 700, the line address of the target differs from the line address of the branch by only a few bits. This difference of only a few bits makes it possible for compression by storing multiple branches in a single entry of the second accelerator by reusing these address bits, rather than storing the address bits separately and uniquely for every branch. A possible implementation of the aforementioned compression is shown in FIG. 8.

FIG. 8 is a table 800 of examples of compression formats used in line exit sequence compression for the second accelerator used in the process of FIG. 3, in accordance with embodiments of the present invention. Format A in table 800 exploits opposing and adjacent lines and utilizes the full target IA. In one embodiment, if the line exit sequence compression technique enters a given line and determines that the next target is in the opposing line (which is calculated by inverting one address bit), only one bit is needed to represent the line, as indicated by Entry Opposing Valid in the Format A column of table 800. Adjacent lines refer to any two lines prior to or after the current line, calculated by decrementing or incrementing the line address of the current line. Only two bits are needed to identify which of the adjacent lines is the target, as indicated by Op2 Adjacent in the Format A column in table 800. The final target is written in its entirety to the entry to ensure a movement to any subsequent target.

As compared to the discussion above regarding adjacent lines, Format B in table 800 takes advantage of locality and supports branches further away from an entry point, given that subsequent targets have the same IA(0:31) as the entry point. Opposing lines are identified as described above.

Table 800 provides an example only. The line exit sequence compression technique can exploit other properties (e.g., sequential line crossings) that are not included in table 800.

In one embodiment, the second accelerator selects from among multiple compression formats (e.g., Format A and Format B in table 800) to fit as many lines as possible into each entry in the second accelerator. In one embodiment, the compression format is selected to support different locality properties. Within the selected compression format, the line exit sequence compression technique compresses a sequence of observed line exit branches into a series of table entries. As the number of required table entries decreases, the compression rate increases and the effective capacity of the second accelerator increases.

In one embodiment, the second accelerator compresses up to nine lines into a single entry (i.e., a single access of the second accelerator results in up to nine lines of output), whereas a single access of a known, prediction latency-optimized accelerator outputs only up to three lines.

In one embodiment, for each table entry or package of the second accelerator, multiple slots are available to store branch target addresses.

Figure 9:
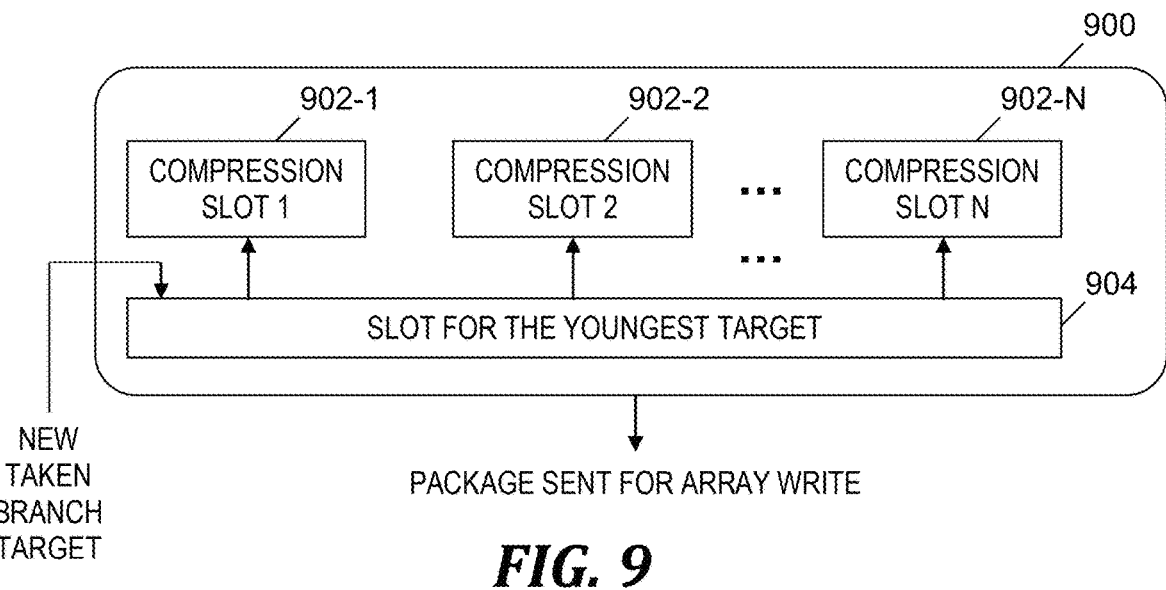
FIG. 9 is an example of a package used in a compression scheme in which multiple compression slots are available in the package to store branch target addresses, in accordance with embodiments of the present invention.

FIG. 9 is an example of a package 900 used in a compression scheme in which multiple compression slots are available in the package to store branch target addresses, in accordance with embodiments of the present invention. Package 900 includes N compression slots 902-1, 902-2, . .

., 902-N (i.e., compression slot 1, compression slot 2, . . . , compression slot N), where N is an integer greater than one. Package 900 further includes a slot for the youngest target 904.

In one embodiment, the line exit sequence compression technique selects the compression scheme so that a newly arriving branch (i.e., new taken branch target shown in FIG. 9) is always installed in slot for the youngest target 904, initially being uncompressed. If the newly arriving line exit branch (also known as "replacer branch") replaces a previous branch that had been occupying the slot for the youngest target 904, then line exit sequence compression module 212 attempts to push up the previous branch into a cheaper compression slot included in compression slot 902-1, 902-2, . . . , 902-N. If the line exit sequence compression module 212 allows the push up of the previous branch, then both the newly arriving branch and the previous branch occupy different slots within a single package (i.e., package 900). If the line exit sequence compression module 212 does not allow the push up of the previous branch, then the previous branch concludes package 900 (i.e., the newly arriving branch is not included in package 900), and the line exit sequence compression module 212 sends package 900 to an array (i.e., table) of the second accelerator, where package 900 is written.

Again, in the case of package 900 being sent in response to the push up not being allowed, the replacer branch is not part of the sent package 900; instead, the replacer branch is used to start a new package (not shown). The new package has components analogous to the components included in package 900. In this case, the replacer branch waits in a youngest target slot (i.e., a slot analogous to the slot for the youngest target 904) in the new package until an arrival of a new youngest line exit branch, at which time the line exit sequence compression module 212 either pushes up the replacer branch to one of the compression slots analogous to compression slots 902-1, 902-2, . . . , 902-N and the new youngest line exit branch is placed in the youngest target slot in the new package. If the aforementioned push up of the replacer branch is not possible, then the replacer branch concludes the new package and the line exit sequence compression module 212 sends the new package for storage in the array of the second accelerator, where the replacer branch in the new package is uncompressed and alone (i.e., no other line exit branches are stored in any of the other slots in the new package).

In one embodiment, the compression slots 902-1, 902-2, . . . , 902-N can be left empty, and line exit sequence compression module 212 populates the compression slots in program order, left-to-right; i.e., compression slot 1 includes the oldest line exit branch (if compression slot 1 is not empty); compression slot 2 contains the next oldest line exit branch (if compression slot 2 is not empty), etc. The youngest line exit branch is always stored in the dedicated youngest target slot (i.e., slot for the youngest target 904).

In one embodiment, the line exit sequence compression module 212 uses the slots shown in FIG. 9 by implementing the following logic:

```
Upon arrival of a new taken branch target:
  if youngest target can move into a compression slot then
    move the youngest target to a next free compression slot
  else
    send package for array write
  youngest target := new taken branch target
```

Figure 10:
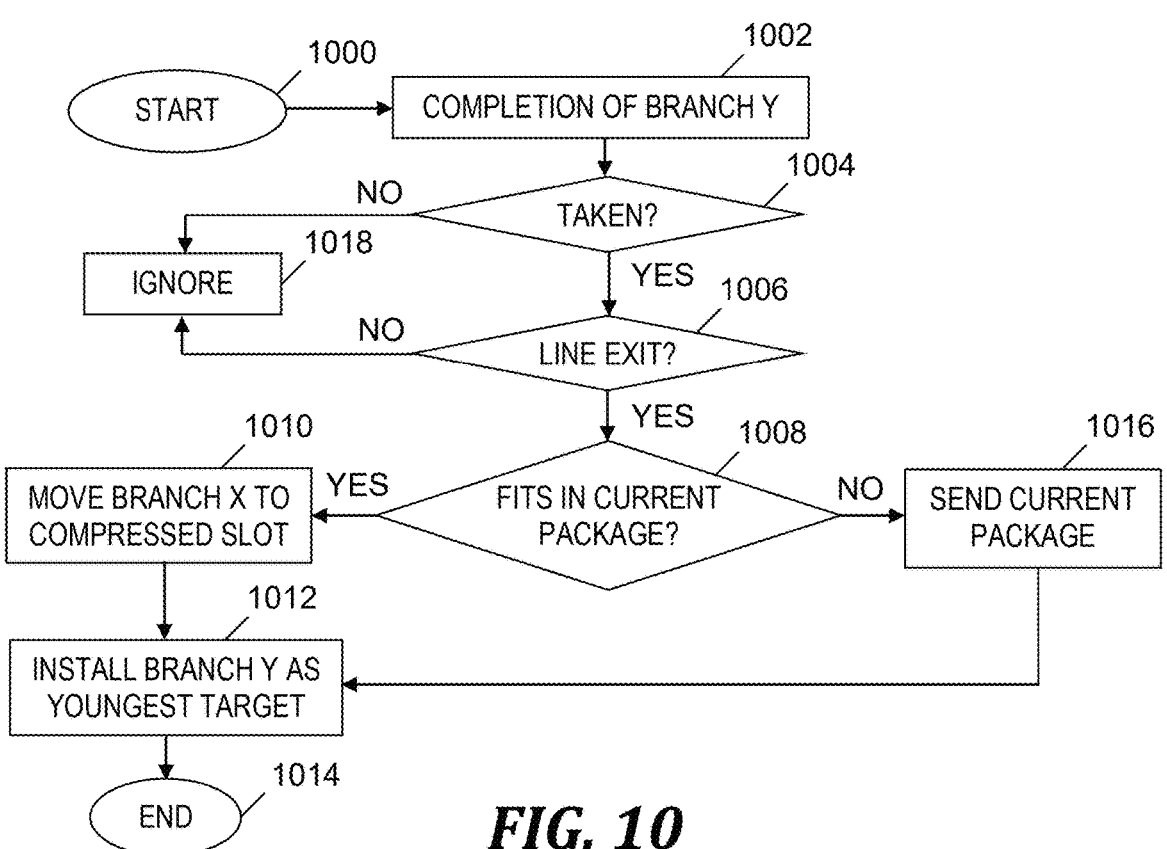
FIG. 10 is a flowchart of a package generation process used by a compression scheme in a line exit sequence compression technique, in accordance with embodiments of the present invention.

FIG. 10 is a flowchart of a package generation process used by a compression scheme in a line exit sequence compression technique, in accordance with embodiments of the present invention. The process of FIG. 10 begins at a start node 1000. In step 1002, the line exit sequence compression module 212 detects a completion of branch Y. In step 1004, the line exit sequence compression module 212 determines whether branch Y is a taken branch. If the line exit sequence compression module 212 determines in step 1004 that branch Y is a taken branch, then the Yes branch of step 1004 is followed and step 1006 is performed.

In step 1006, the line exit sequence compression module 212 determines whether branch Y is a line exit branch. If the line exit sequence compression module 212 determines in step 1006 that branch Y is a line exit branch, then the Yes branch of step 1006 is followed and step 1008 is performed.

In step 1008, the line exit sequence compression module 212 determines whether a branch X (i.e., a line exit branch currently installed as the youngest target) fits in the current package (i.e., fits into a free compression slot in package 900). If line exit sequence compression module 212 determines in step 1008 that branch X fits in the current package, then the Yes branch of step 1008 is followed and step 1010 is performed.

In step 1010, line exit sequence compression module 212 moves branch X to a next empty compressed slot included in the compressed slots 902-1, 902-2, . . . , 902-N. In step 1012, line exit sequence compression module 212 installs branch Y as the youngest target (i.e., places branch Y in slot for the youngest target 904). Following step 1012, the process of FIG. 10 ends at an end node 1014.

Returning to step 1008, if line exit sequence compression module 212 determines that branch X does not fit in the current package, then the No branch of step 1008 is followed and step 1016 is performed. In step 1016, line exit sequence compression module 212 sends the current package to be written in the array of the second accelerator, and sets up a new package as the next package to be sent for storage in the array of the second accelerator. Following step 1016, line exit sequence compression module 212 in step 1012 installs branch Y as the youngest target in the new package. After step 1012, which follows step 1016, the process of FIG. 10 ends at the end node 1014.

Returning to step 1006, if line exit sequence compression module 212 determines that branch Y is not a line exit branch, then the No branch of step 1006 is followed and step 1018 is followed. In step 1018, the line exit sequence compression module 212 ignores branch Y for further processing in the process of FIG. 10.

Returning to step 1004, if line exit sequence compression module 212 determines that branch Y is not a taken branch target, then the No branch of step 1004 is taken and step 1018 is performed, as described above.

In one embodiment, multiple compression schemes coexist and line exit sequence compression module 212 selects a compression scheme from the multiple compression schemes on-the-fly, to achieve the highest compression rate for the executed computer program. Each compression scheme is defined to serve a particular sequence of branch patterns that is typically observed in computer programs. For example, compression scheme A is defined to store branches to adjacent cache lines, followed by a far branch target, while compression scheme B is defined to store multiple branches that branch anywhere within the current 64 kB code block. Compression scheme A uses only a proper subset of the compression slots, whereas compression scheme B uses another proper subset of the compression slots. Line exit sequence compression module 212 can choose other compression schemes; for example, a compression scheme specifically designed to serve branches for subroutine calls or subroutine returns.

Upon reading the table entry in the second accelerator, line exit sequence compression module 212 interprets and expands the compressed package into the sequence of uncompressed line exit target addresses that were encountered during package generation. In one embodiment, line exit sequence compression module 212 uses the address of the last (i.e., youngest) expansion from the table entry to form the search address for the next array read access.
Prefetch Information Applying the line exit sequence compression technique disclosed herein can introduce an implementation challenge. Specifically, in a sufficiently sized accelerator, where line exits are effectively compressed, it is possible that the footprint of the accelerator actually exceeds the footprint of the instruction cache. In such cases, the accelerator allows its predictions to stay well ahead of code execution, but instruction fetch and decode are limited due to the penalty of instruction cache misses. It is possible to modify this design by providing prefetch addresses to the instruction cache earlier than what is allowed by using only the first accelerator.

Using only the first accelerator in known techniques, it is not possible to provide prefetch information to the instruction cache any earlier than prediction time via the prediction pipeline because the BTB is the only structure in the known techniques that contains enough instruction address information for the instruction cache to generate a fetch. If fetch is running well ahead of execution, it is possible for the instruction cache to exploit this condition (i.e., if downstream decode/execution is unable to accept more instruction text, then opportunities are opened for the instruction cache to prefetch data). The earlier that prefetch information is provided, the more likely it is that the instruction cache is able to use the information.

In one embodiment, the BTB is a hierarchical BTB that includes BTB1 and BTB2 (i.e., a first BTB and a second BTB), where the configuration of the hierarchical BTB is similar to a data cache having an L1-cache and an L2-cache. In this embodiment, it is possible that the footprint of the instruction cache exceeds that of the BTB1, but the BTB2 covers or exceeds the footprint of the instruction cache. In a case of prefetching the instruction cache, where the BTB1 footprint is insufficient, a prefetch into the BTB1 via the BTB2 is required to avoid making branch prediction the bottleneck.

In the embodiment described above that includes the hierarchical BTB, and using the first and second accelerators disclosed herein, two possible queues of BTB1 indices can be generated, where the first accelerator can be accessed quickly, while access of the second accelerator takes more time due to different optimizations. Because the second accelerator contains more address bits (as discussed below relative to FIG. 11), a prefetch can be sent to the instruction cache early, which differs from known techniques whereby the creation of the instruction cache prefetch cannot be done until prediction time because the address bits are needed from the BTB1, which have not yet been read. In this embodiment, it is possible that cache data is being brought in early, and this data may not have prediction data in the BTB1, while the prediction data may be in the BTB2. Therefore, to keep the L1 instruction cache and the BTB1 in sync, a prefetch must also be triggered into the BTB2; otherwise, the BTB1 could become a performance bottleneck.

Figures 11, 12:
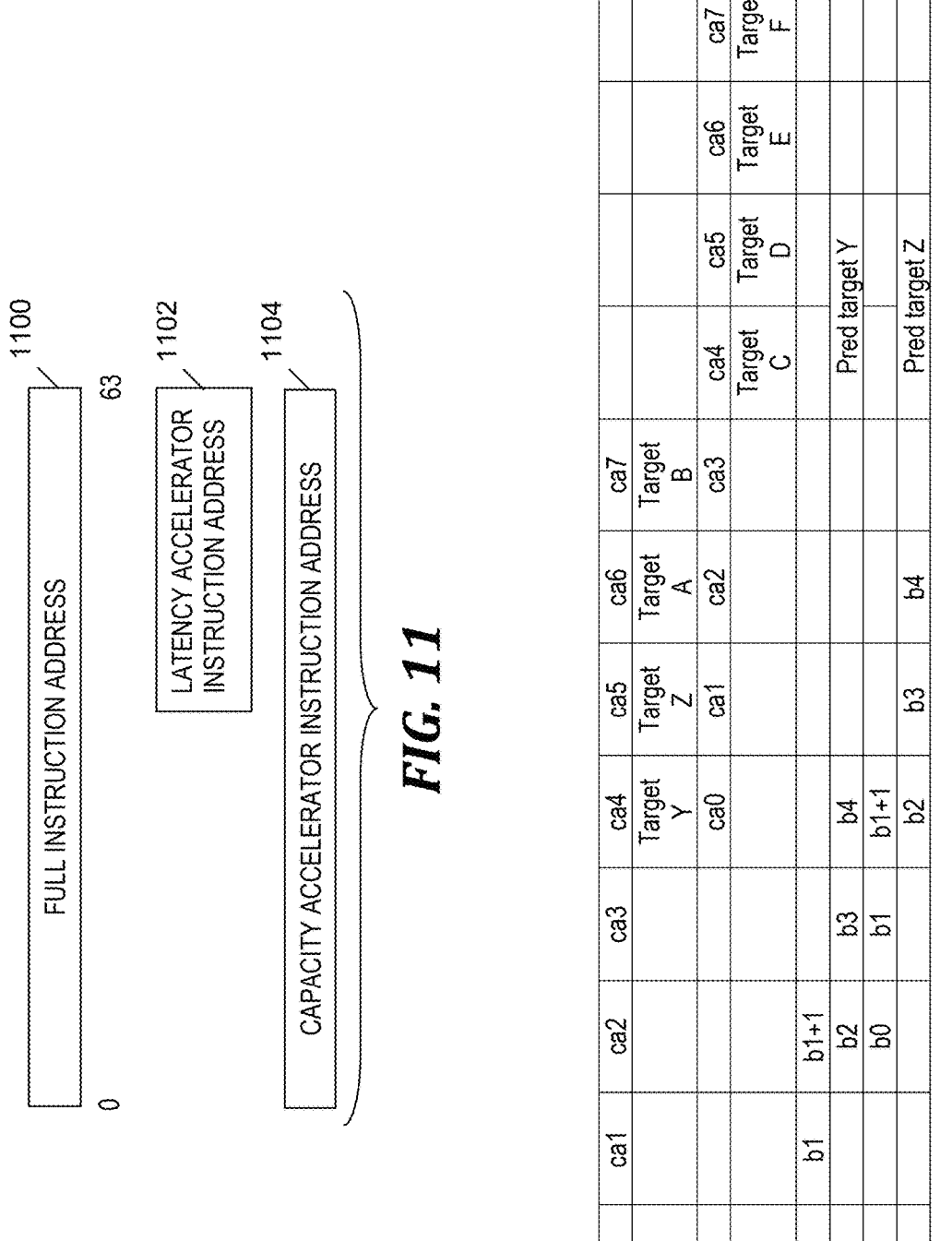
FIG. 11 is an example of instruction addresses illustrating that the second accelerator is sufficient and the first accelerator is insufficient to store full instruction addresses required provide an instruction cache with prefetch information, in accordance with embodiments of the present invention.
FIG. 12 is an example illustrating that compression in the second accelerator advantageously allows a provision of prefetch information earlier than prediction logic, in accordance with embodiments of the present invention.

FIG. 11 is an example of instruction addresses illustrating that the second accelerator (i.e., capacity accelerator) is sufficient and the first accelerator (i.e., latency accelerator) is insufficient to store full instruction addresses required provide an instruction cache with prefetch information, in accordance with embodiments of the present invention. The prefetch information includes a full instruction address 1100, which is shown in FIG. 11 together with indicators of bits 0 and 63.

The smaller latency accelerator is not able to facilitate the prefetch. Like the larger capacity accelerator, the latency accelerator reindexes itself, allowing the latency accelerator to run ahead of the prediction pipeline. But in order to keep the structure of the latency accelerator small, a limited number of address bits are stored in a latency accelerator instruction address 1102. This limited number of address bits is insufficient to send full instruction address 1100 to the instruction cache in order to perform a prefetch. The larger, compressed capacity accelerator is able store enough information in a capacity accelerator instruction address 1104 to provide the instruction cache with prefetch information including the full instruction address 1100 earlier in the pipeline than is done using known techniques. This ability of the capacity accelerator to provide the instruction cache with the prefetch information earlier in the pipeline provides more opportunities to hide cache miss penalties than were available in known techniques.

FIG. 12 is an example 1200 illustrating that compression in the second accelerator (i.e., capacity accelerator) advantageously allows a provision of prefetch information earlier than prediction logic, in accordance with embodiments of the present invention. Example 1200 includes examples of accelerator, index, and prediction pipelines, which operate independently. Example 1200 further includes labels of ca0 through ca7, which refer to pipeline cycles. The accelerator pipeline, through one access of the capacity accelerator, generates multiple line exits, which is shown in example 1200 by Target Y, Target Z, Target A, and Target B resulting from a single access, and Target C, Target D, Target E, and Target F resulting from another single access. In contrast, the prediction pipeline generates only one new line exit every other cycle. When well-compressed, the capacity accelerator can generate targets more quickly and provide prefetch information earlier than known prediction logic. As used herein, well-compressed means that each of a substantial number of entries of the capacity accelerator includes more than one branch.

What is claimed is:

1. A computer-implemented method to improve execution of a computer program by a processor set, the method comprising:

generating initial branch target buffer (BTB) search index results in a first stream of BTB search index results for the computer program by searching a first accelerator optimized to minimize prediction latency, wherein the first accelerator is a first memory device coupled to the processor set;

adding the initial BTB search index results as tentative items in a search index list;

generating other BTB search index results in a second stream of BTB search index results for the computer program by searching a second accelerator optimized to maximize capacity, the second accelerator running concurrently with the first accelerator, wherein the second accelerator is a second memory device coupled to the processor set, the second memory device having a capacity greater than the first memory device;

determining one or more differences between one or more results of the other BTB search index results and one or more results of the initial BTB search index results based on a comparison between respective results in the other BTB search index results and the initial BTB search index results; and in response to the determining the one or more differences, replacing, by the processor set, the one or more results of the initial BTB search index results in the search index list with the one or more results of the other BTB search index results in order to execute the one or more results of the other BTB, thereby improving a speed of the execution of the computer program.

2. The method of claim 1, further comprising:

generating second initial BTB search index results within the first stream;

adding the second initial BTB search index results as second tentative items in the search index list;

generating second other BTB search index results within the second stream;

determining the second other BTB search index results are identical to the second initial BTB search index results; and in response to the determining the second other BTB search index results are identical to the second initial BTB search index results, confirming the second initial BTB search index results as final items in the search index list.

3. The method of claim 1, further comprising:

in response to the replacing in the search index list the initial BTB search index results with the other BTB search index results, restarting the first accelerator using a last result of the other BTB search index results.

4. The method of claim 1, further comprising:

generating second initial BTB search index results within the first stream;

adding the second initial BTB search index results as second tentative items in the search index list;

generating second other BTB search index results within the second stream;

determining the second initial BTB search index results are used as a prediction in the search index list;

determining the second other BTB search index results were generated subsequent to the second initial BTB search index results being used as the prediction in the search index list; and in response to the determining the second other BTB search index results were generated subsequent to the second initial BTB search index results being used as the prediction, restarting the second accelerator based on a target address of a recent branch prediction provided by the search index list.

5. The method of claim 1, wherein the generating the other BTB search index results in the second stream includes generating multiple BTB search index results in a single access of the second accelerator.

6. The method of claim 1, wherein the generating the other BTB search index results in the second stream includes generating the other BTB search index results by using resolved branch information, and wherein the second accelerator is more accurate than the first accelerator based on the generating the other BTB search index results by using the resolved branch information.

7. The method of claim 1, further comprising:

based on the second accelerator being sized to include a number of bits of a full instruction address that is required for an instruction cache to prefetch data, providing a prefetch address to the instruction cache earlier than a prediction time;

providing a hierarchical BTB that includes a first BTB and a second BTB; and triggering a prefetch into the second BTB to provide a synchronization between the instruction cache and the first BTB and prevent a performance bottleneck in the first BTB.

8. The method of claim 1, further comprising:

storing and compressing multiple line exit branches in a given entry included in multiple entries of a table of the second accelerator, wherein the given entry represents a compressed sequence of the multiple line exit branches, which are encountered in a program flow;

extracting the given entry in a single access of the second accelerator;

executing a hit detect logic for the extracted given entry;

based on the executed hit detect logic, selecting the given entry from the multiple entries of the table;

sending the selected given entry to an expansion engine;

converting, by the expansion engine, the compressed sequence of line exit branches into decompressed multiple lines indicating predicted targets; and adding the decompressed multiple lines to the second stream of BTB search index results.

9. The method of claim 8, further comprising:

reindexing the second accelerator based on a final target in the sequence of line exit branches; and finding a next sequence of line exit branches by using the reindexed second accelerator.

10. The method of claim 8, further comprising:

determining a first set of higher-order bits and a second set of higher-order bits are identical, the first set of higher-order bits being in an address of a target of one of the multiple line exit branches and the second set of higher-order bits being in an address of a line exit branch associated with the target; and based on the first and second sets of higher-order bits being identical, storing a specified portion of the address of the target without storing another portion of the address of the target.

11. A computer system comprising:

a processor set;

a set of one or more computer-readable storage media; and program instructions, collectively stored in the set of one or more computer-readable storage media, for causing the processor set to perform the following computer operations:

generate initial branch target buffer (BTB) search index results in a first stream of BTB search index results for the program instructions by searching a first accelerator optimized to minimize prediction latency, wherein the first accelerator is a first memory device coupled to the processor set;

add the initial BTB search index results as tentative items in a search index list;

generate other BTB search index results in a second stream of BTB search index results for the program instructions by searching a second accelerator optimized to maximize capacity, the second accelerator running concurrently with the first accelerator, wherein the second accelerator is a second memory device coupled to the processor set, the second memory device having a capacity greater than the first memory device;

determine one or more differences between one or more results of the other BTB search index results and one or more results of the initial BTB search index results based on a comparison between respective results in the other BTB search index results and the initial BTB search index results; and in response to determining the one or more differences, replace the one or more results of the initial BTB search index results in the search index list with the one or more results of the other BTB search index results in order to execute the one or more results of the other BTB, thereby improving a speed of the execution of the program instructions.

12. The computer system of claim 11, wherein the program instructions cause the processor set to perform the following additional computer operations:

generate second initial BTB search index results within the first stream;

add the second initial BTB search index results as second tentative items in the search index list;

generate second other BTB search index results within the second stream;

determine the second other BTB search index results are identical to the second initial BTB search index results; and in response to determining the second other BTB search index results are identical to the second initial BTB search index results, confirm the second initial BTB search index results as final items in the search index list.

13. The computer system of claim 11, wherein the program instructions cause the processor set to perform the following additional computer operation:

in response to replacing in the search index list the initial BTB search index results with the other BTB search index results, restart the first accelerator using a last result of the other BTB search index results.

14. The computer system of claim 11, wherein the program instructions cause the processor set to perform the following additional computer operations:

generate second initial BTB search index results within the first stream;

add the second initial BTB search index results as second tentative items in the search index list;

generate second other BTB search index results within the second stream;

determine the second initial BTB search index results are used as a prediction in the search index list;

determine the second other BTB search index results were generated subsequent to the second initial BTB search index results being used as the prediction in the search index list; and in response to determining the second other BTB search index results were generated subsequent to the second initial BTB search index results being used as the prediction, restart the second accelerator based on a target address of a recent branch prediction provided by the search index list.

15. The computer system of claim 11, wherein the program instructions for causing the processor set to perform the computer operation of generate the other BTB search index results in the second stream includes program instructions for causing the processor set to perform the computer operation of generate multiple BTB search index results in a single access of the second accelerator.

16. The computer system of claim 11, wherein the program instructions for causing the processor set to perform the computer operation of generate the other BTB search index results in the second stream includes program instructions for causing the processor set to perform the computer operation of generate the other BTB search index results by using resolved branch information, and wherein the second accelerator is more accurate than the first accelerator based on generating the other BTB search index results by using the resolved branch information.

17. The computer system of claim 11, wherein the program instructions cause the processor set to perform the following additional computer operations:

based on the second accelerator being sized to include a number of bits of a full instruction address that is required for an instruction cache to prefetch data, provide a prefetch address to the instruction cache earlier than a prediction time;

provide a hierarchical BTB that includes a first BTB and a second BTB; and trigger a prefetch into the second BTB to provide a synchronization between the instruction cache and the first BTB and prevent a performance bottleneck in the first BTB.

18. The computer system of claim 11, wherein the program instructions cause the processor set to perform the following additional computer operations:

store and compress multiple line exit branches in a given entry included in multiple entries of a table of the second accelerator, wherein the given entry represents a compressed sequence of the multiple line exit branches, which are encountered in a program flow;

extract the given entry in a single access of the second accelerator;

execute a hit detect logic for the extracted given entry;

based on the executed hit detect logic, select the given entry from the multiple entries of the table;

send the selected given entry to an expansion engine;

convert, by the expansion engine, the compressed sequence of line exit branches into decompressed multiple lines indicating predicted targets; and add the decompressed multiple lines to the second stream of BTB search index results.

19. The computer system of claim 11, wherein the program instructions cause the processor set to perform the following additional computer operations:

reindex the second accelerator based on a final target in the sequence of line exit branches; and find a next sequence of line exit branches by using the reindexed second accelerator.

20. A computer program product comprising:

a set of one or more computer-readable storage media; and program instructions, collectively stored in the set of one or more computer-readable storage media, for causing a processor set to perform the following computer operations:

generate initial branch target buffer (BTB) search index results in a first stream of BTB search index results for the program instructions by searching a first accelerator optimized to minimize prediction latency, wherein the first accelerator is a first memory device coupled to the processor set;

add the initial BTB search index results as tentative items in a search index list;

generate other BTB search index results in a second
stream of BTB search index results for the program
instructions by searching a second accelerator opti-
mized to maximize capacity, the second accelerator
running concurrently with the first accelerator,
wherein the second accelerator is a second memory
device coupled to the processor set, the second
memory device having a capacity greater than the
first memory device;

determine one or more differences between one or more
results of the other BTB search index results and one
or more results of the initial BTB search index
results based on a comparison between respective
results in the other BTB search index results and the
initial BTB search index results; and in response to determining the one or more differences,
replace the one or more results of the initial BTB
search index results in the search index list with the
one or more results of the other BTB search index
results in order to execute the one or more results of
the other BTB, thereby improving a speed of the
execution of the program instructions.

* * * * *